June 3, 1952  M. A. RYAN  2,598,835
SLIP ROD GAUGE

Filed Dec. 28, 1948  2 SHEETS—SHEET 1

INVENTOR.
M. A. RYAN
BY Hudson & Young
ATTORNEYS

June 3, 1952  M. A. RYAN  2,598,835
SLIP ROD GAUGE

Filed Dec. 28, 1948  2 SHEETS—SHEET 2

INVENTOR.
M. A. RYAN
BY Hudson & Young
ATTORNEYS

Patented June 3, 1952

2,598,835

UNITED STATES PATENT OFFICE 2,598,835

SLIP ROD GAUGE

Martin A. Ryan, Bartlesville, Okla., assignor to Phillips Petroleum Company, a corporation of Delaware Application December 28, 1948, Serial No. 67,683

8 Claims. (Cl. 73—314)

This invention relates to safety liquid level gauges especially useful for volatile liquids. In one specific aspect it relates to liquid level gauges in which a measuring arm is moved longitudinally of a sealed tube extending into a tank containing a volatile liquid and having a signalling system actuated by proximity to a float for indicating by the position of the measuring arm at the time of a signal the liquid level in a tank containing a volatile liquid. In other specific aspects the invention relates to features of construction of a liquid level gauge.

Considerable danger and difficulty has been experienced in the prior art in gauging the liquid level of volatile liquids especially when the same are inflammable and/or corrosive. For example in measuring the level of liquified petroleum gases such as butane and/or propane in tanks containing the same, especially railroad cars, it is customary to use a slip tube gauge comprising a pipe running through a stuffing box in the tank and having a valve on the outer end of the same. By opening the valve and noting whether liquid in the form of a white vapor or gas in the form of a colorless vapor comes out of the tube into the atmosphere, the level of the liquid is determined. Among the disadvantages inherent in such a device is the fact that inflammable vapors are discharged to the atmosphere with some danger of fire. The vapor pressure in the tank tends to extrude the tube forcibly through the stuffing box which creates a hazard of serious injury to the operator by being struck by the moving tube, and the stuffing box may start to leak inflammable liquids or vapors which leakage creates a fire hazard. In spite of these enumerated disadvantages there are so many greater disadvantages to other prior systems that they are of little value. Most floats tend to beat themselves to pieces and thereupon fill with liquid and sink, especially, when employed in railroad tank cars during transit. There are numerous other disadvantages to the many devices proposed in the prior art.

One object of the present invention is to provide a safe and accurate liquid level gauge for use with tanks containing a volatile liquid.

Another object is to provide a liquid level gauge insertable as a unit into sealing relation with the tank and having a longitudinally movable member entirely out of contact with the liquid or vapor in a tank.

Another object is to provide such a gauge including a float chamber removable with the gauge and having suitable means for dampening the movement of the float.

Another object is to provide a liquid level gauge having an electric signalling circuit which will be safe in the presence of volatile and/or inflammable liquids or their vapors in the event accidental leakage should occur.

Further objects are to provide suitable details of construction which will provide a strong and reliable liquid level gauge.

Another object is to provide a magnetic switch for an electric signalling circuit which operates by the repulsion of like poles of two magnets rather than the attraction of unlike poles in order to provide greater accuracy.

Further objects are to provide details of construction of a suitable safe electric signalling system.

Numerous other objects and advantages will be apparent to those skilled in the art upon reading the accompanying specification, claims and drawings.

While the devices shown in the present specification and drawings are stated to be for use with volatile liquids, it is obvious they are just as effective with non-volatile liquids. The gauging of non-volatile liquids is so easily accomplished with simpler means however, that the present invention finds its greatest commercial utility with volatile liquids especially when the same are corrosive or inflammable, but obviously the present invention may be used with any liquid, and prevents exposure to air or contamination.

Figure 1:
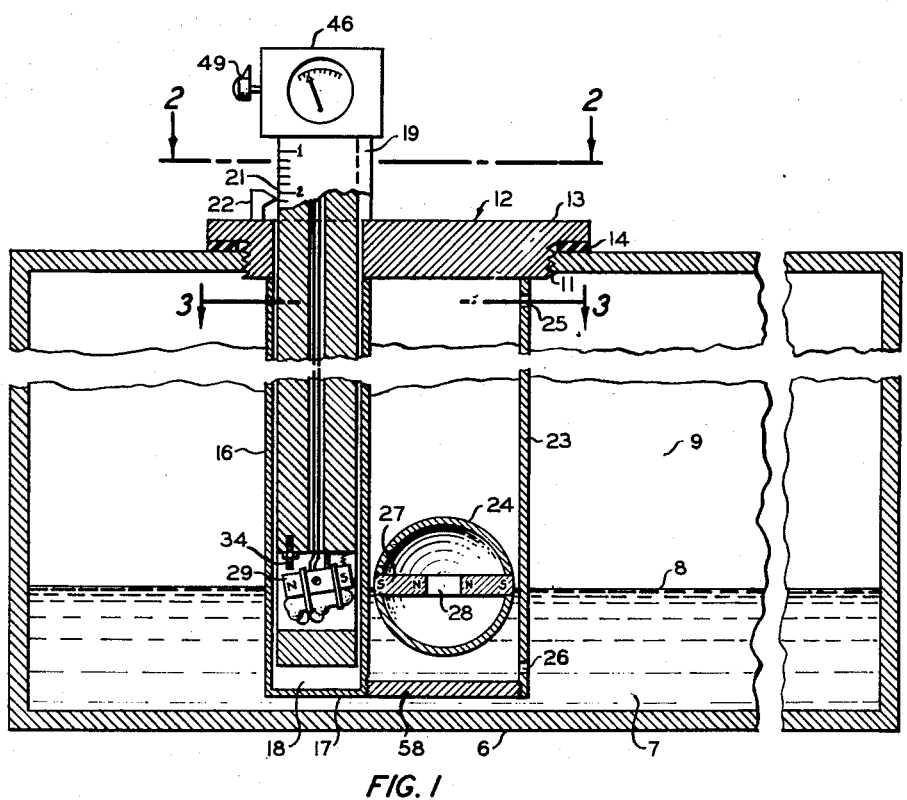
Figure 1 is an elevational view mostly in cross section of the tank having a liquid level gauge embodying the present invention.
Figure 2:
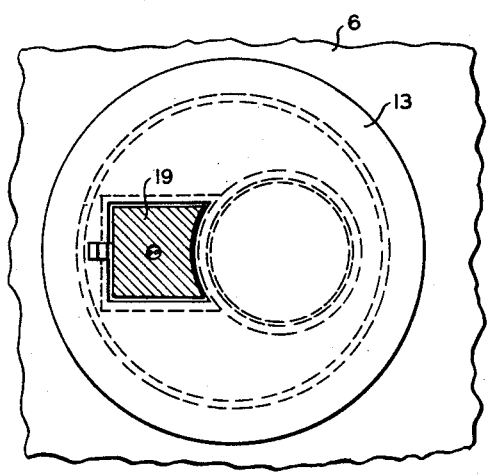
Figure 2 is a plane view with some parts in cross section taken along the line 2—2 of Figure 1 looking in the direction indicated.
Figure 3:
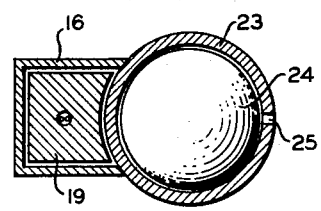
Figure 3 is a cross sectional view taken along the line 3—3 of Figure 1 looking in the direction indicated.

In Figure 1 a tank 6 contains a volatile liquid 7 having a liquid level 8, space 9 above the liquid level being filled with vapors from liquid 7. Tank 6 is provided with an opening 11 receiving a liquid level gauge generally designated as 12.

Obviously tank 6 is provided with other controlled openings, but as these other openings do not relate to the present invention they are not shown. Such other openings (not shown) would normally include an inlet, an outlet, an excess pressure and/or thermal relief valve, a pressure gauge if desired, and all desired connections well known to the prior art.

Gauge 12 comprises a body member 13 adapted to be secured in and closing said opening 11. If desired a sealing gasket 14 may be provided. Body member 13 has a closed tube 16 depending therefrom and extending into said tank, the lower end of tube 16 being closed at 17. Tube 16 contains a space 18 communicating with the atmosphere and sealed from communication with tank 6.

Extending into space 18 is a measuring member 19 which is movable longitudinally in tube 16. The position of member 19 is to be an indication of liquid level 8 and in order to more accurately determine its position member 19 may be provided with marking lines 21 and body 13 may be provided with an indicating arm 22. Markings 21 may be evenly spaced to measure length or they may be calibrated to indicate equal volumes by calibrations involving the shape and size of tank 6. As tanks such as 6 may be of different size it is generally preferred to have markings 21 in equal units of length such as fractions of an inch and let the owner of the tank prepare a table stating what volume is represented thereby.

Also secured to and depending from body 13 into tank 6 is a float chamber 23 containing a float 24 of suitable construction to float adjacent the surface 8 of liquid 7. As such floats tend to surge around violently at such times as the railroad cars are coupled, it is preferred to provide chamber 23 with a restricted orifice 25 adjacent its upper end and a similar orifice 26 near the bottom. Liquid passes through 26 slowly and vapors 9 pass slowly through opening 25 so float 24 will move very slowly and not damage itself by violent contact. Obviously more openings may be provided with a reduction of the dampening effect.

Float 24 is provided with an annular magnet 27 having one magnetic polarity around its circumference. Such annular magnetic plates having an opening 28 in the center around which the opposite magnetic polarity is concentrated are known in the prior art. However, a number of radially disposed magnets having like outer poles may be employed as equivalent and in its broadest aspect a single bar magnet may be employed in float 24 if the float is made non-circular and is prevented from rotating by the shape of chamber 23. However, it is preferred to have float 24 in the form of a sphere and magnet 27 in the form of a ring as shown and have float 24 lightly guided by a cylindrical tube 23, so that the float will not be hampered in seeking its true level in floating on the liquid. A calibration table may be provided for use with liquids 7 of different specific gravities because obviously float 24 will float at different elevations in such liquids, but once the gravity of the liquid is known the position of the float is determined relative to that liquid.

Figure 4:
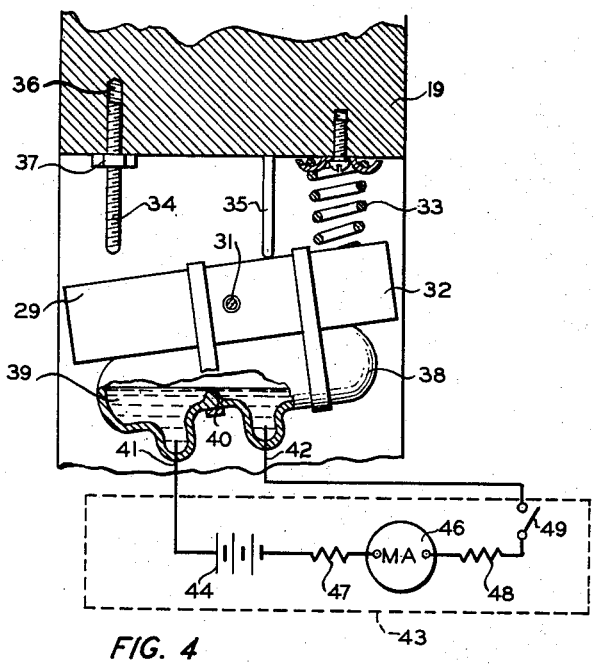
Figure 4 is an enlarged view of a portion of Figure 1 showing the magnetic electric switch in greater detail and also showing the wiring diagram of a preferred electrical signalling circuit for the same.

As shown more clearly in Figure 4 member 19 has a second magnet 29 pivoted thereto at 31 for rotation around said pivot. While useful results may be obtained with either pole of magnet 29 coming into proximity with magnet 27, I prefer to have this proximate pole 32 of the same polarity as the circumferential pole of magnet 27, and as shown they are both south poles.

Biasing means, such as compression spring 33, is provided to urge magnet 29 to rotate about pivot 31 clockwise as shown in Figure 4 and stop means 34 is provided to limit such rotation, preferably to a horizontal position. While the resilience of spring 33 will limit the rotation of magnet 29 it is preferred to have a stop member 35 which may be similar to 34 in construction to limit counterclockwise movement of magnet 29 to a specific position, preferably that shown in Figure 4 at the point of rotation at which mercury 39 will flow to form a single body over the separating ridge 40 in the glass tube 38. Screw 34 may be positioned in threaded bore 36 and held in adjusted position by lock nut 37 in order to position magnet 29 as desired.

An electrical switch is secured to magnet 29 and in Figure 4 this electrical switch is shown as a mercury switch 38 containing mercury 39 secured in a glass tube which on tilting will break the circuit at separating ridge 40 between wires 41 and 42.

An electrical signalling and indicating circuit is provided as shown in box 43 comprising wires 41, 42 and switch 38 along with a source of electric potential 44 and a potential indicating means 46. While not essential, it is preferred to have protective resistances 47 and 48 and a manual electric switch of the explosion-proof type 49 in the circuit in order to increase the safety of the device and conserve the potential of battery 44.

Figure 5:
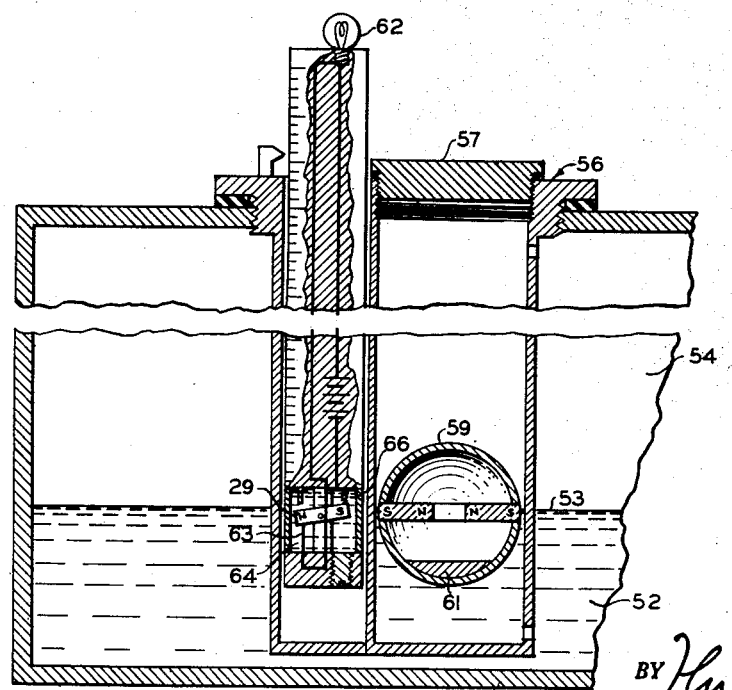
Figure 5 is a view similar to Figure 1 but showing a modified form of a gauge embodying a second modification of the present invention.

In Figure 5 tank 51 containing liquid 52 having a liquid level 53 and a vapor space 54 is provided with a second species of liquid level gauge generally designated as 56. As this device is much the same as that shown in Figure 1 it is not believed necessary to go into the same detail in describing it, but merely to point out differences in construction. The float chamber is accessible through a removable screw plug 57 at the top of the gauge instead of through a similar plug 58 at the bottom of the gauge of Figure 1. The float 59 is provided with a counterweight 61 whereas in Figure 1 the float 24 is stabilized by having a heavier bottom half. An incandescent lamp 62 is substituted for milliammeter 46 of Figure 4, and magnet 29 in Figure 5 forms part of the electrical circuit and part of an open contact switch with wire 63. Sparking at switch 29, 63 in Figure 5 is prevented by a heavy non-volatile, non-inflammable liquid such as transformer oil 64 contained in a chamber formed by walls 66.

As all the other features of Figure 5 are clearly the same as described in Figures 1 and 4, it is believed unnecessary to describe them further.

Operation

In Figure 1 member 19 is pushed slowly down into tube 16. At first spring 33 forces magnet 29 against stop 34 in a horizontal position causing mercury 39 to be broken in two separate parts, which interrupts the circuit between wires 41 and 42 so that milliammeter 46 gives a zero indication.

As the south pole of magnet 29 approaches the south pole of 27, the magnetic fields oppose each other and when the opposition is sufficient, magnet 29 rotates into the position shown in Figure 4 allowing mercury 39 to consolidate as a single body closing the circuit between wires 41 and 42 so that milliammeter 46 will give a reading. Further rotation of magnet 29 is prevented by stop member 35. Because of the indication of the milliammeter 46 the operator knows that liquid level 8 is being approached and slows down the movement of 19 but continues to move it downward very slowly. The instant that the effective magnetic center of the south pole of magnet 29 gets below the effective magnetic center of magnet 27 the upward vector of the magnetic repulsive force on magnet 29 is changed to a downward vector. This results in snap action, and magnet 29 immediately rotates clockwise aided by spring 33 until it strikes stop 34. Mercury 39 separates suddenly into two parts on opposite sides of ridge 40 breaking the circuit between wires 41 and 42 and milliammeter 46 drops to zero. The operator notes the position of member 19 at the time the milliammeter drops to zero and writes down the value of graduations 21 opposite pointer 22. This gives a very accurate indication of the liquid level 8.

The operation of Figure 5 is the same except incandescent lamp 62 is illuminated at times that milliammeter 46 is giving a reading, and is out at times when milliammeter 46 reads zero.

Obviously indications can be obtained with the attraction of unlike poles, but they will not be as accurate, as the snap action occuring with the repulsion of like poles of magnets 27 and 29. This is because unlike poles tend to pivot magnet 29 toward the other magnet at all times whereas with unlike poles there is snap action due to a sudden reversal of vector forces when one like pole passes the elevation of the other like pole.

The electrical system employed conforms to the best practices and all fire regulations relative to electrical switches near inflammable volatile liquids. These regulations state that all switches must be of a non-explosive type such as a mercury switch in a sealed tube 38, or a contact switch 29, 63 in an enclosed chamber 66 filled with heavy non-volatile liquid 64. Switch 49 may be either of these type switches, or any other approved non-explosive switch. Parts 16, 19, 23, 24 and like parts, are non-magnetic metal.

Stop 35 may be made adjustable like stop 34. Stop 35 is not needed in Figure 5 because contact 63 acts as the stop, and 63 may be made adjustable like stop 34.

While two specific embodiments of preferred forms of the invention have been shown for illustrative purposes, it should be understood the invention is not limited thereto, but is as defined by the appended claims.

Having described my invention, I claim:

1. A safety liquid level gauge for use with a tank containing a liquid comprising in combination a tube adapted to be secured in sealed relation to said tank and having a sealed end extending into said tank, a stilling chamber mounted on said tube, a float disposed in said stilling chamber to float upon the surface of the liquid in said tank, a first magnet on said float having a first magnetic polarity around its circumference, a member slidable in said tube and extending outside said tank, a second magnet pivoted to said member and movable therewith longitudinally of said tube, said second magnet being disposed to present one pole of similar polarity to the circumferential polarity of said first magnet in passing the same within the range of magnetic interaction therewith, means biasing said second magnet to rotate around its pivot, stop means limiting said rotation of said second magnet, switch means actuated by the pivoting of said second magnet in response to magnetic forces in the proximity of said first magnet, an impervious envelope enclosing said switch means, said envelope being filled with a non-volatile non-inflammable liquid, an electric signalling circuit including said switch means, a source of electric potential and an electric potential indicating means, and means indicating the position of said member relative to said tube whereby the position of said member when said indicating means is actuated is indicative of the level of the liquid in said tank.

2. A safety liquid level gauge for use with a tank containing a liquid comprising in combination a tube adapted to be secured in sealed relation to said tank and having a sealed end extending into said tank, a float disposed to float upon the surface of the liquid in said tank, a first magnet on said float having a first magnetic polarity around its circumference, a member slidable in said tube and extending outside said tank, a second magnet pivoted to said member and movable therewith longitudinally of said tube, said second magnet being disposed to present one pole of similar polarity to the circumferential polarity of said first magnet in passing the same within the range of magnetic interaction therewith, means biasing said second magnet to rotate around its pivot, stop means limiting said rotation of said second magnet, switch means actuated by the pivoting of said second magnet in response to magnetic forces in the proximity of said first magnet, an impervious envelope inclosing said switch means, said envelope being filled with a non-volatile non-inflammable liquid, an electric signalling circuit including said switch means, a source of electric potential and an electric potential indicating means, and means indicating the position of said member relative to said tube whereby the position of said member when said indicating means is actuated is indicative of the level of the liquid in said tank.

3. A safety liquid level gauge for use with a tank containing a liquid comprising in combination a tube adapted to be secured in sealed relation to said tank and having a sealed end extending into said tank, a stilling chamber mounted on said tube, a float disposed in said stilling chamber to float upon the surface of the liquid in said tank, a first magnet on said float, a member slidable in said tube and extending outside said tank, a second magnet pivoted to said member and movable therewith longitudinally of said tube, said second magnet being disposed to present one pole to said first magnet in passing the same within the range of magnetic interaction therewith, means biasing said second magnet to rotate around its pivot, stop means limiting said rotation of said second magnet, switch means actuated by the pivoting of said second magnet in response to magnetic forces in the proximity of said first magnet, an impervious envelope inclosing said switch means, said envelope being filled with a non-volatile non-inflammable liquid, an electric signalling circuit including said switch means, a source of electric potential and an electric potential indicating means, and means indicating the position of said member relative to said tube whereby the position of said member when said indicating means is actuated is indicative of the level of the liquid in said tank.

4. A safety liquid level gauge for use with a tank containing a liquid comprising in combination a tube adapted to be secured in sealed relation to said tank and having a sealed end extending into said tank, a stilling chamber mounted on said tube, a float disposed in said stilling chamber to float upon the surface of the liquid in said tank, a first magnet on said float having a first magnetic polarity around its circumference, a member slidable in said tube and extending outside said tank, a second magnet pivoted to said member and movable therewith longitudinally of said tube, said second magnet being disposed to present one pole of similar polarity to the circumferential polarity of said first magnet in passing the same within the range of magnetic interaction therewith, means biasing said second magnet to rotate around its pivot, stop means limiting said rotation of said second magnet, switch means actuated by the pivoting of said second magnet in response to magnetic forces in the proximity of said first magnet, an electric signalling circuit including said switch means, a source of electric potential and an electric potential indicating means, and means indicating the position of said member relative to said tube whereby the position of said member when said indicating means is actuated is indicative of the level of the liquid in said tank.

5. A safety liquid level gauge for use with a tank containing a liquid comprising in combination a tube adapted to be secured in sealed relation to said tank and having a sealed end extending into said tank, a stilling chamber mounted on said tube, a float disposed in said stilling chamber to float upon the surface of the liquid in said tank, a first magnet on said float, a member slidable in said tube and extending outside said tank, a second magnet pivoted to said member and movable therewith longitudinally of said tube, said second magnet being disposed to present one pole to said first magnet in passing the same within the range of magnetic interaction therewith, means biasing said second magnet to rotate around its pivot, stop means limiting said rotation of said second magnet, switch means actuated by the pivoting of said second magnet in response to magnetic forces in the proximity of said first magnet, an impervious envelope inclosing said switch means, an electric signalling circuit including said switch means, a source of electric potential and an electric potential indicating means, and means indicating the position of said member relative to said tube whereby the position of said member when said indicating means is actuated is indicative of the level of the liquid in said tank.

6. A safety liquid level gauge for use with a tank containing a liquid comprising in combination a tube adapted to be secured in sealed relation to said tank and having a sealed end extending into said tank, a float disposed to float upon the surface of the liquid in said tank, means guiding said float adjacent said tube, a first magnet on said float having a first magnetic polarity around its circumference, a member slidable in said tube and extending outside said tank, a second magnet pivoted to said member and movable therewith longitudinally of said tube, said second magnet being disposed to present one pole of similar polarity to the circumferential polarity of said first magnet in passing the same within the range of magnetic interaction therewith, means biasing said second magnet to rotate around its pivot, stop means limiting said rotation of said second magnet, switch means actuated by the pivoting of said second magnet in response to magnetic forces in the proximity of said first magnet, an impervious envelope inclosing said switch means, an electric signalling circuit including said switch means, a source of electric potential and an electric potential indicating means, and means indicating the position of said member relative to said tube whereby the position of said member when said indicating means is actuated is indicative of the level of the liquid in said tank.

7. A safety liquid level gauge for use with a tank containing a liquid comprising in combination a tube adapted to be secured in sealed relation to said tank and having a sealed end extending into said tank, a float disposed to float upon the surface of the liquid in said tank, means guiding said float adjacent said tube, a first magnet on said float, a member slidable in said tube and extending outside said tank, a second magnet pivoted to said member and movable therewith longitudinally of said tube, said second magnet being disposed to present one pole to said first magnet in passing the same within the range of magnetic interaction therewith, means biasing said second magnet to rotate around its pivot, stop means limiting said rotation of said second magnet, switch means actuated by the pivoting of said second magnet in response to magnetic forces in the proximity of said first magnet, an impervious envelope inclosing said switch means, said envelope being filled with a non-volatile non-inflammable liquid, an electric signalling circuit including said switch means, a source of electric potential and an electric potential indicating means, and means indicating the position of said member relative to said tube whereby the position of said member when said indicating means is actuated is indicative of the level of the liquid in said tank.

8. A safety liquid level gauge for use with a tank containing a liquid comprising in combination a tube adapted to be secured in sealed relation to said tank and having a sealed end extending into said tank, a float disposed to float upon the surface of the liquid in said tank, means guiding said float adjacent said tube, a first magnet on said float, a member slidable in said tube and extending outside said tank, a second magnet pivoted to said member and movable therewith longitudinally of said tube, said second magnet being disposed to present one pole to said first magnet in passing the same within the range of magnetic interaction therewith, means biasing said second magnet to rotate around its pivot, stop means limiting said rotation of said second magnet, switch means actuated by the pivoting of said second magnet in response to magnetic forces in the proximity of said first magnet, an electric signalling circuit including said switch means, a source of electric potential and an electric potential indicating means, and means indicating the position of said member relative to said tube whereby the position of said member when said indicating means is actuated is indicative of the level of the liquid in said tank.

MARTIN A. RYAN.

REFERENCES CITED

The following references are of record in the file of this patent:

UNITED STATES PATENTS

| Number | Name | Date |
|---|---|---|
| 1,502,125 | Scott | July 22, 1924 |
| 2,032,370 | Larkin | Mar. 3, 1937 |
| 2,233,572 | Atkins | Mar. 4, 1941 |
| 2,339,922 | Gatewood | Jan. 25, 1944 |
| 2,357,745 | Kliever | Sept. 5, 1944 |
| 2,484,690 | De Giers | Oct. 11, 1949 |

FOREIGN PATENTS

| Number | Country | Date |
|---|---|---|
| 13,382 | Great Britain | Aug. 24, 1889 |